United States Patent

Mo et al.

[11] Patent Number: 5,827,189
[45] Date of Patent: Oct. 27, 1998

[54] METHOD AND APPARATUS FOR PREVENTING AXIAL SPATIAL ALIASING IN ULTRASOUND IMAGER HAVING COMPLEX SIGNAL DETECTOR

[75] Inventors: Larry Y. L. Mo, Waukesha; Theodore Lauer Rhyne, Whitefish Bay; Steven C. Miller; Christopher J. Gilling, both of Pewaukee; Kok-Hwee Ng, Elkhorn; John E. Mahony, Whitefish Bay, all of Wis.

[73] Assignee: General Electric Company, Milwaukee, Wis.

[21] Appl. No.: 777,564

[22] Filed: Dec. 30, 1996

[51] Int. Cl.[6] .................................................. A61B 8/06
[52] U.S. Cl. ........................................................ 600/454
[58] Field of Search ....................... 128/661.08, 661.09; 367/89

[56] References Cited

U.S. PATENT DOCUMENTS 5,398,216  3/1995  Hall et al. ................................. 367/90
5,501,223  3/1996  Washburn et al. .................. 128/661.09

Primary Examiner—Marvin M. Lateef
Assistant Examiner—Mau Patel
Attorney, Agent, or Firm—Dennis M. Flaherty; John H. Pilarski

[57] ABSTRACT

A method using a progressive sampling rate technique to maintain the sampling rate at the Nyquist frequency of the I/Q data through a tunable equalization bandpass filter in the front end of the imager and then increasing the sampling rate via axial interpolation to prevent aliasing during the non-linear detection process. If an envelope detector is used, the bandwidth of the detector output should be approximately double that of the I/Q data. In this case, the sampling rate is doubled (or more) by axial interpolation before envelope detection. A 2-point linear interpolator can be used. Depending on the application, this axial interpolator can be turned on or off automatically by the system. After detection, the signal can be low-pass filtered to restrict the speckle bandwidth prior to log compression.

20 Claims, 3 Drawing Sheets

METHOD AND APPARATUS FOR PREVENTING AXIAL SPATIAL ALIASING IN ULTRASOUND IMAGER HAVING COMPLEX SIGNAL DETECTOR

FIELD OF THE INVENTION

This invention generally relates to ultrasound imaging of human tissue and blood. In particular, the invention relates to methods for controlling the data sampling rate to satisfy the Nyquist frequency requirement during signal processing in an ultrasound imager having a complex signal detector.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred beam direction and is focused at a selected range along the beam. Multiple firings may be used to acquire data representing the desired anatomical information along a multiplicity of scan lines. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer is employed to receive the reflected sound (receiver mode). The voltages produced at the receiving transducers are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer. The reflected ultrasound is sampled from the focal zones of two or more beams focused at different depths along the same scan line. For each steering angle, the sampled data from contiguous focal zones is acquired and then spliced to make one vector or A-line. A multiplicity of vectors, one for each beam focal point, are used, along with interpolated data values, to operate the pixels on the display monitor to form a full image frame.

Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along a scan line. The receiver is dynamically focused at a succession of ranges or depths along the scan line as the reflected ultrasonic waves are received.

In a conventional ultrasound imager, B-mode image formation consists of signal reception (transducer array, beamformer and filters), detection, and post-processing, including log compression and scan conversion. On many commercial scanners, the received radio-frequency (RF) signal is first shifted to an intermediate frequency (IF), and is then detected using a rectifier followed by a low-pass filter.

However, the present invention pertains to an ultrasound imager with a complex signal architecture. Specifically, the bandpass RF signal is represented by its complex (I, Q) signal pair whose spectrum can be centered around the carrier frequency, an IF, or in baseband. This (I, Q) data can be obtained by taking the Hilbert transform of the RF data, or by heterodyne demodulation, before or after the channel sum in the front-end beamformer unit.

For a digital system, the (I, Q) signal representation offers three advantages: 1) a significantly lower data sampling rate can be used in the front-end because the Nyquist rate of a complex bandpass signal is determined by its bandwidth about the center frequency; 2) envelope detection $((I+Q)^{1/2})$ can be performed with greater precision than with a rectifier/ low-pass filter detector; and 3) greater flexibility in supporting alternative detection methods including the square law detector and any tissue characterization operator that uses the RF amplitude and phase information. Although complex bandpass I/Q data can be equally detected, basebanded (I, Q) is the preferred data type since it can be directly processed for Doppler velocity measurements.

It is well known that envelope detection of a Gaussian random signal, such as the backscatter from soft tissue, can result in a considerable bandwidth expansion. Intuitively this can be explained by the fact that the nonlinear detection operation introduces higher spectral components. It can be shown that square law detection $(I^2+Q^2)$ approximately doubles the signal bandwidth, and that a further square root operation can produce a small additional bandwidth expansion. This has been confirmed in controlled phantom experiments.

Whereas the envelope detector can more than double the signal bandwidth, the subsequent log compression process can produce even larger bandwidth expansion. This is readily understood by viewing the log operation as an infinite power series. Depending on the display-sampling rate requirement, however, the bandwidth at the input of the log compression device can be restricted by low-pass filtering, thereby limiting the bandwidth expansion resulting from the log compression.

A potential pitfall of supplying basebanded I/Q data to the envelope detector is that the I/Q Nyquist sampling rate is no longer sufficient for a detection process that more than doubles the signal bandwidth. If the I/Q Nyquist sampling rate is maintained all the way through the detector, axial spatial aliasing would result, which is visualized as a distracting "dancing dot" or "barber pole" artifact in the image whenever there is axial motion from frame to frame. The dilemma posed is that to double the sampling rate in the front-end of the imager, so that it can accommodate the bandwidth expansion after detection, would defeat one of the main purposes of basebanding the RF signal, namely, to minimize sampling rate/hardware cost.

SUMMARY OF THE INVENTION

The present invention is a method for preventing axial spatial aliasing resulting from the nonlinear detection performed in an ultrasound imager of the type employing a complex signal detector. In accordance with the preferred embodiment, a progressive sampling rate technique is used to maintain the sampling rate at (or above) the Nyquist frequency of the I/Q data through a tunable equalization bandpass filter in the front end of the imager and then to increase the sampling rate via axial interpolation to prevent aliasing during the nonlinear detection process. If an envelope detector is used, the bandwidth of the detector output is approximately double that of the I/Q data. In this case, the sampling rate should be increased two-fold (or more) via axial interpolation before envelope detection. A simple yet very effective sample rate doubling can be formed with a 2-point linear interpolator. Depending on the application, this axial interpolator can be turned on or off automatically by the system. The detected signal is often low-pass filtered to restrict the speckle bandwidth to that compatible with the display vector size (number of pixels per vector). Higher-order interpolation functions and/or greater than 2× interpolation may be used to further reduce axial aliasing, especially if greater than conventional display vector sizes are used.

DETAILED DESCRIPTION OF THE PREFERRED EMBODIMENTS

Figure 1:
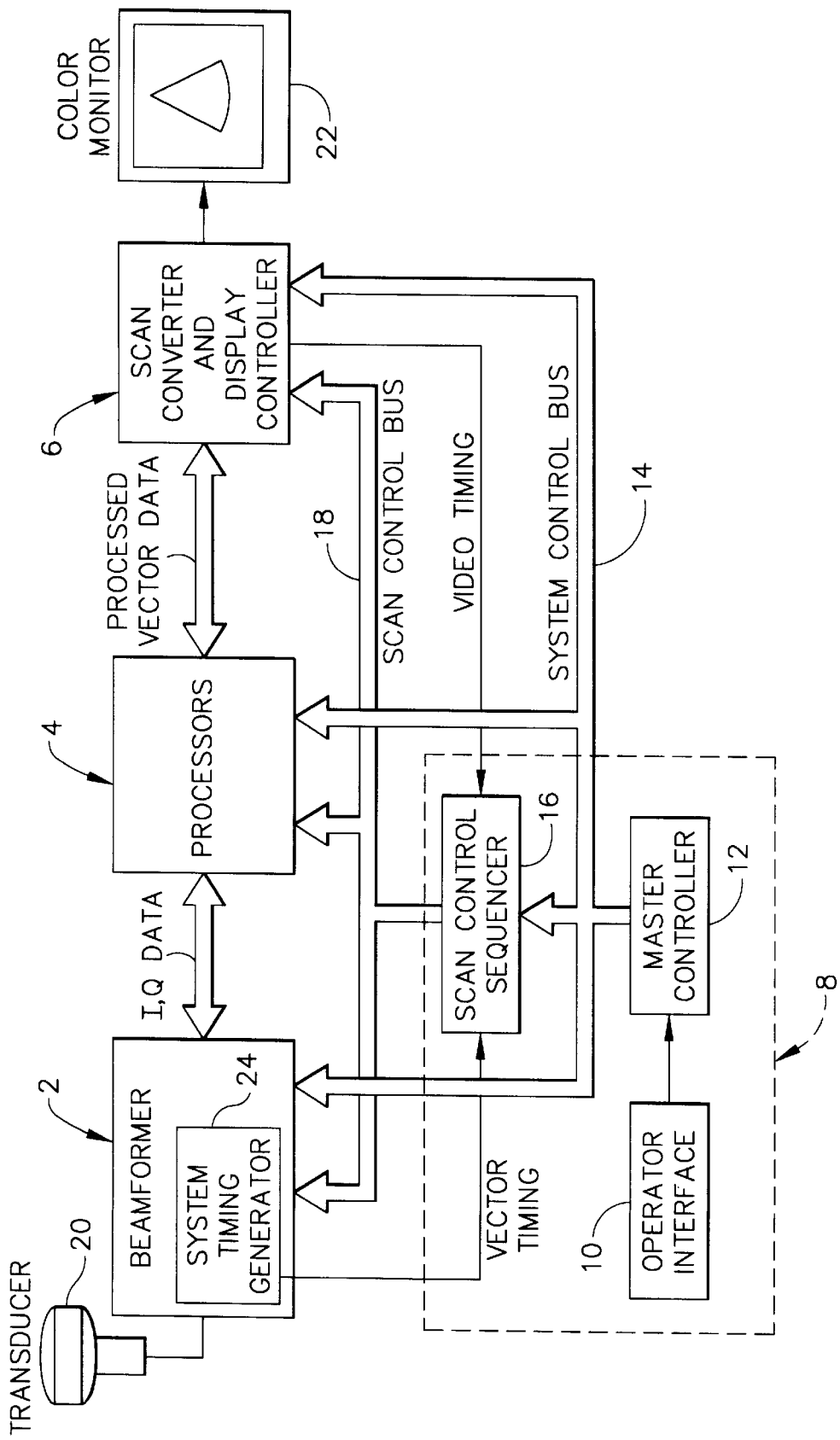
FIG. 1 is a block diagram showing the major functional subsystems within a real-time ultrasound imaging system.

The present invention is incorporated in an ultrasound imaging system consisting of four main subsystems: a beamformer 2, processors 4 (including a separate processor for each different mode), a scan converter/display controller 6 and a kernel 8. System control is centered in the kernel 8, which accepts operator inputs through an operator interface 10 and in turn controls the various subsystems. The master controller 12 performs system level control functions. It accepts inputs from the operator via the operator interface 10 as well as system status changes (e.g., mode changes) and makes appropriate system changes either directly or via the scan controller. The system control bus 14 provides the interface from the master controller to the subsystems. The scan control sequencer 16 provides real-time (acoustic vector rate) control inputs to the beamformer 2, system timing generator 24, processors 4 and scan converter 6. The scan control sequencer 16 is programmed by the host with the vector sequences and synchronization options for acoustic frame acquisitions. Thus, the scan control sequencer controls the beam distribution and the beam density. The scan converter broadcasts the beam parameters defined by the host to the subsystems via scan control bus 18.

The main data path begins with the analog RF inputs to the beamformer 2 from the transducer 20. The beamformer 2 outputs two summed digital baseband I, Q receive data streams, which are derived from the reflected ultrasound for each transmit beams. The I, Q data is input to a processor 4, where it is processed according to the acquisition mode and output as processed vector data to the scan converter/display processor 6. The scan converter 6 accepts the processed vector data, interpolates where necessary, and outputs the video display signals for the image to a color monitor 22. The displayed image is a sector or linear scan representing the tissue and/or blood flow in a plane through the body being imaged.

Figure 2:
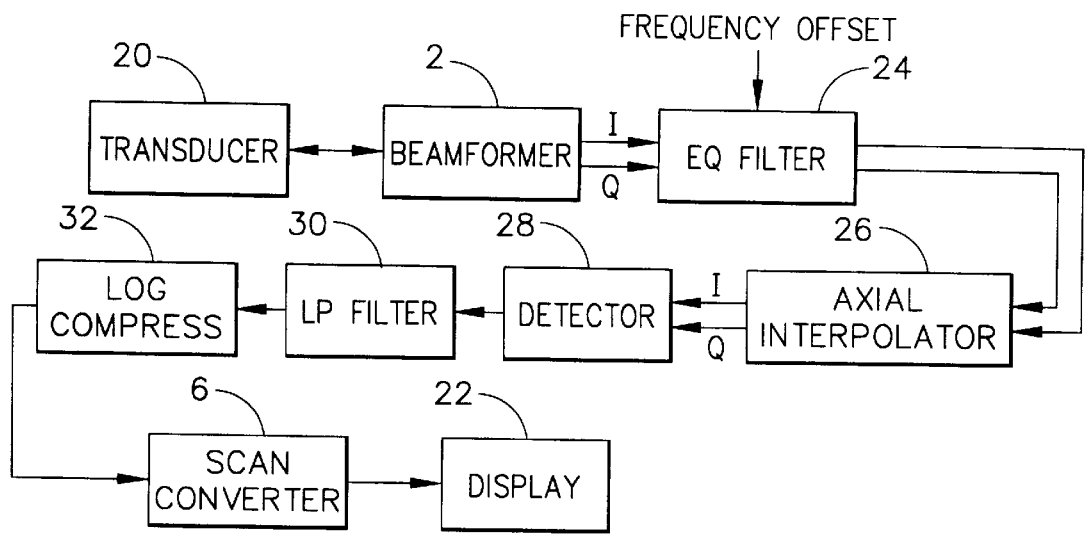
FIG. 2 is a block diagram showing the main signal processing blocks of an ultrasonic imager with an axial interpolator preceding the complex signal detector in accordance with the present invention.

The theory of operation in accordance with the present invention will now be described with reference to an ultrasound imaging system of the type having a complex signal detector, as shown in FIG. 2. In the ultrasound imager of FIG. 2, the beamformer comprises a transmitter (not shown) for transmitting a transmit ultrasound waveform having a frequency spectrum which is centered at a predetermined frequency by exciting selected transducer array elements. The transmit ultrasound waveform is focused at a focal point and usually steered at an angle. The beamformer further comprises conventional means for forming a limited-bandwidth complex signal pair (I and Q signals) of a receive ultrasound waveform derived from the portion of the transmit ultrasound waveform reflected back to selected receiving transducer elements by scatterers in a focal zone encompassing the focal point.

In the ultrasound imaging system shown in FIG. 2, an equalization filter 24 receives the complex I and Q outputs from the beamformer 2 and passes a bandwidth which is a function of the bandwidth of the input signals. In accordance with the invention, the outputs of equalization filter 24 are transmitted to an axial interpolator 26 which adds interpolated data values to the stream of I samples and interpolated data values to the stream of Q samples. In accordance with the preferred embodiment of the invention, axial interpolator 26 doubles the number of samples. Thus, the $I_{int}$ and $Q_{int}$ outputs from the interpolator have a sampling rate which is double that of the I and Q outputs input to the interpolator from the equalization filter 24. The complex signals $I_{int}$ and $Q_{int}$ are then input into the envelope detector 28, which calculates the function $(I_{int}^2+Q_{int}^2)^{1/2}$. This envelope detection approximately doubles the signal bandwidth. Thereafter the envelope is passed through a low pass filter 30 and then the filtered envelope undergoes logarithmic data compression (block 32). The log-compressed signal is output to the scan converter 6 and is then displayed as a vector on monitor 22. The logarithmic compression process can produce further bandwidth expansion, and at some point beyond the low pass filter, the data stream may need to be downsampled to that compatible with the display vector size. Thus, the low pass filter 30 serves as an anti-aliasing filter before data sampling, or it may simply be used to reduce speckle, which will also restrict any further bandwidth expansion during the logarithmic operation.

Figure 3A:
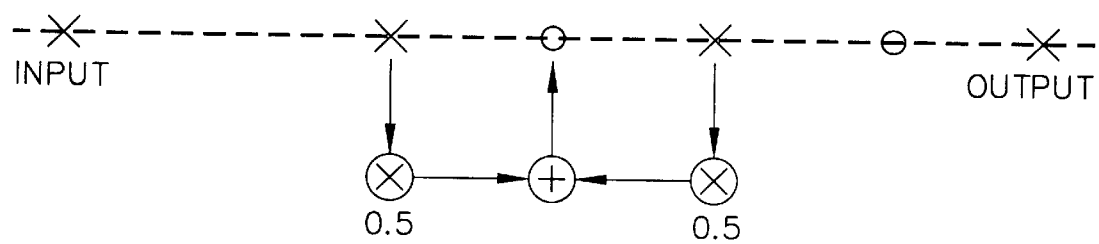
FIGS. 3A and 3B are schematic diagrams illustrating two weighting schemes which can be used by the axial interpolator in accordance with first and second preferred embodiments of the invention.
Figure 3B:
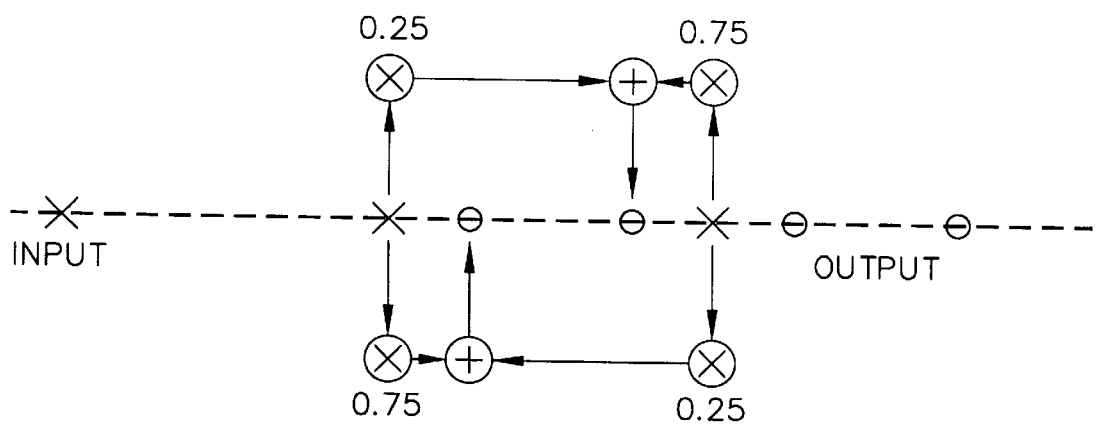

Two weighting schemes for a 2-point linear I/Q interpolator in accordance with preferred embodiments of the invention are depicted in FIGS. 3A and 3B. FIG. 3A illustrates a weighting scheme wherein the interpolated value will be the average of the two values, e.g., $I_{int}=0.5I_1+0.5I_2$ and $Q_{int}=0.5Q_1+0.5Q_2$. The scheme of FIG. 3A uses the input data while interpolating an additional sample per period in the output. FIG. 3B illustrates a scheme which produces only interpolated samples in the output using weighting factors of 0.25 and 0.75, e.g., $I_{int1}=0.75I_1+0.25I_2$, $I_{int2}=0.25I_1+0.75I_2$, $Q_{int1}=0.75Q_1+0.25Q_2$, and $Q_{int2}=0.25Q_1+0.75Q_2$. These two weighting schemes would be equivalent if the interpolation process were a perfect one. In practice, however, a 2-point averaging filter will introduce some interpolation error. Therefore the 0.75/0.25 is the preferred weighting scheme since it tends to distribute interpolation errors evenly over the output samples. In contrast, the 0.5/0.5 weighting scheme may produce alternating sharp and smeared horizontal lines in the image due to the fact that the real samples along each scan line contain no interpolation errors, whereas their adjacent samples were obtained by interpolation.

Figure 4:
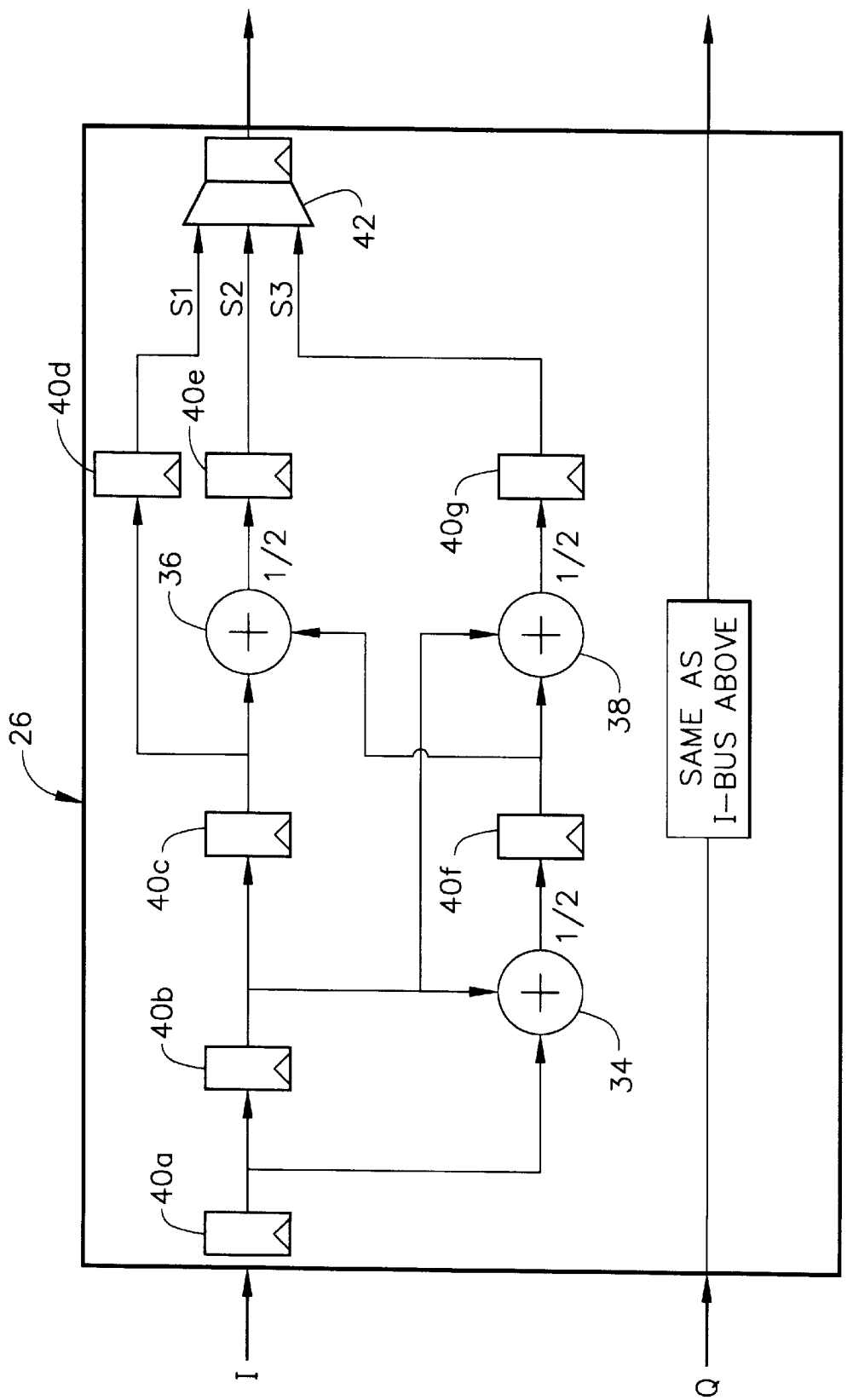
FIG. 4 is a block diagram showing an implementation of the axial interpolator in accordance with the second preferred embodiment depicted in FIG. 3B.

A key advantage of the 2× linear interpolator is ease of implementation. FIG. 4 shows an implementation of the 0.75/0.25 weighting scheme using three adders 34, 36 and 38, a plurality of delay taps 40a–40g, and a switch 42. The output of each adder is effectively multiplied by one-half by dropping the least significant bit of the digital adder output. When the axial interpolator 26 is turned on, the output will be a 0.75/0.25 and 0.25/0.75 interpolated version of the input data. For example, if the input data samples are $I_1$, $I_2$ and $I_3$ in succession, then the interpolator will output $S2=0.75I_1+0.25I_2$ followed by $S3=0.25I_1+0.75I_2$ for the first interpolated complex signal pair. The second complex signal pair in order will be $S2=0.75I_2+0.25I_3$ followed by $S3=0.25I_2+0.75I_3$. The S1 path is for bypass or no interpolation.

Simulations based on experimental I/Q data indicated that the interpolation errors associated with the 0.75/0.25 weighting scheme is quite acceptable from an image quality standpoint. However, it should be clear that the interpolation errors can be further reduced by using higher-order interpolation filters and extending the 0.75/0.25 weighting scheme to spread residual interpolation errors evenly over the output samples. Based on I/Q data sampled at around their Nyquist rate, it was found that an ideal (sinc function) interpolator can make a small additional improvement over the simple linear interpolator.

The foregoing preferred embodiments have been disclosed for the purpose of illustration. Variations and modifications will be readily apparent to those skilled in the art of ultrasonic imaging systems. All such variations and modifications are intended to be encompassed by the claims set forth hereinafter.

We claim:

1. A method of operating an ultrasound imaging system having a transducer array, comprising the steps of:

transmitting a multiplicity of ultrasound transmit beams from said transducer array in a plane intersecting a mass of ultrasound scatterers, each of said transmit beams having a respective steering angle and a respective focal point; and for each respective transmit beam, performing the following steps:

acquiring first and second basebanded complex signals from a portion of said respective transmit beam reflected by said ultrasound scatterers back to and detected by said transducer array, said first basebanded complex signal consisting of a first stream of acquired samples processed at a predetermined sampling rate and said second basebanded complex signal consisting of a second stream of acquired samples processed at said predetermined sampling rate;

interpolating said acquired samples of said first stream to form a first multiplicity of interpolated samples which are interleaved between said acquired samples of said first stream, said first stream of acquired samples and said first multiplicity of interpolated samples forming a third stream of samples having a sampling rate greater than said predetermined sampling rate;

interpolating said acquired samples of said second stream to form a second multiplicity of interpolated samples which are interleaved between said acquired samples of said second stream, said second stream of acquired samples and said second multiplicity of interpolated samples forming a fourth stream of samples having a sampling rate greater than said predetermined sampling rate; and forming the envelope of said first and second basebanded complex signals by operating on said samples of said third and fourth streams, and further comprising the step of:

displaying an image frame which is a function of said envelopes derived from said multiplicity of transmit beams.

2. The method as defined in claim 1, wherein said third and fourth streams of samples each have a sampling rate approximately equal to two times said predetermined sampling rate.

3. The method as defined in claim 1, wherein interpolation is performed by averaging successive acquired samples of said first and second limited bandwidth complex signals.

4. The method as defined in claim 1, further comprising the step of bandpass filtering said first and second limited bandwidth complex signals prior to interpolation.

5. The method as defined in claim 1, further comprising the steps of low-pass filtering said envelope.

6. A method of operating an ultrasound imaging system having a transducer array, comprising the steps of:

transmitting a multiplicity of ultrasound transmit beams from said transducer array in a plane intersecting a mass of ultrasound scatterers, each of said transmit beams having a respective steering angle and a respective focal point; and for each respective transmit beam, performing the following steps:

acquiring first and second basebanded complex signals from a portion of said respective transmit beam reflected by said ultrasound scatterers back to and detected by said transducer array, said first basebanded complex signal consisting of a first stream of acquired samples processed at a predetermined sampling rate and said second basebanded complex signal consisting of a second stream of acquired samples processed at said predetermined sampling rate;

interpolating said acquired samples of said first stream to form a third stream of interpolated samples at a sampling rate greater than said predetermined sampling rate, said acquired samples of said first stream being replaced by said interpolated samples of said third stream;

interpolating said acquired samples of said second stream to form a fourth stream of interpolated samples at a sampling rate greater than said predetermined sampling rate, said acquired samples of said second stream being replaced by said interpolated samples of said fourth stream;

forming the envelope of said first and second basebanded complex signals by operating on said interpolated samples of said third and fourth streams, and further comprising the step of:

displaying an image frame which is a function of said envelopes derived from said multiplicity of transmit beams.

7. The method as defined in claim 6, wherein said third and fourth streams of samples each have a sampling rate approximately equal to two times said predetermined sampling rate.

8. The method as defined in claim 6, wherein interpolation is performed using first and second sets of weighting factors, said first set of weighting factors being 0.25/0.75 and said second set of weighting factors being 0.75/0.25.

9. The method as defined in claim 6, further comprising the step of bandpass filtering said first and second limited bandwidth complex signals prior to interpolation.

10. The method as defined in claim 6, further comprising the steps of low-pass filtering said envelope.

11. An ultrasound imaging system comprising:

a transducer array;

means for transmitting a transmit beam from said transducer array in a plane intersecting a mass of ultrasound scatterers, said transmit beam having a focal point;

means for acquiring respective first and second basebanded complex signals from a portion of said transmit beam reflected by said ultrasound scatterers back to and detected by said transducer array, said first basebanded complex signal consisting of a first stream of acquired samples processed at a first sampling rate and said second basebanded complex signal consisting of a second stream of acquired samples processed at said first sampling rate;

first sampling rate increasing means for increasing the sampling rate of said first limited basebanded complex signal to a second sampling rate by interpolation;

second sampling rate increasing means for increasing the sampling rate of said second limited basebanded complex signal to said second sampling rate by interpolation;

means for detecting said first and second limited basebanded complex signals when said first and second limited basebanded complex signals have said second sampling rate; and means for displaying an image line which is a function of said detected first and second basebanded complex signals.

12. The ultrasound imaging system as defined in claim 11, wherein said second sampling rate is approximately equal to two times said first sampling rate.

13. The ultrasound imaging system as defined in claim 11, wherein said first sampling rate increasing means performs interpolation by averaging successive acquired samples of said first stream to form a first multiplicity of interpolated samples and interleaving said first multiplicity of interpolated samples between said acquired samples of said first stream, and said second sampling rate increasing means performs interpolation by averaging successive acquired samples of said second stream to form a second multiplicity of interpolated samples and interleaving said second multiplicity of interpolated samples between said acquired samples of said second stream.

14. The ultrasound imaging system as defined in claim 11, wherein said first sampling rate increasing means performs interpolation by forming a first weighted average of successive acquired samples of said first stream and said second sampling rate increasing means performs interpolation by forming a second weighted average of successive acquired samples of said second stream, said first and second weighted averages being formed using weighting factors of 0.25 and 0.75.

15. The ultrasound imaging system as defined in claim 11, further comprising means for bandpass filtering said first and second limited bandwidth complex signals, said bandpass filtering means being arranged between said acquiring means and said first and second sampling rate increasing means.

16. The ultrasound imaging system as defined in claim 11, wherein said detecting means comprises an envelope detector.

17. The ultrasound imaging system as defined in claim 16, further comprising means for low-pass filtering having inputs connected to outputs of said envelope detector.

18. The ultrasound imaging system as defined in claim 17, further comprising means for logarithmically compressing an output of said low-pass filtering means.

19. The ultrasound imaging system as defined in claim 11, wherein said first sampling rate increasing means comprises:

an input;

a first one-cycle delay circuit connected to said input and producing a first one-cycle delay output;

a second one-cycle delay circuit connected to said output of said first one-cycle delay circuit and producing a second one-cycle delay output;

a first summer connected to add said outputs of said first and second one-cycle delay circuits and producing a first summer output;

first halving means for computing one-half of said output of said first summer and producing a first halving means output;

a third one-cycle delay circuit connected to receive said output of said first halving means and producing a third one-cycle delay output;

a second summer connected to add said outputs of said second and third one-cycle delay circuits and producing a second summer output; and second halving means for computing one-half of said output of said second summer and producing a second halving means output.

20. The ultrasound imaging system as defined in claim 19, wherein said detecting means comprises an envelope detector connected to said second halving means output of said first sampling rate increasing means.

* * * * *